(12) United States Patent
Arai et al.

(10) Patent No.: US 10,888,965 B2
(45) Date of Patent: Jan. 12, 2021

(54) CONSTANT TEMPERATURE WATER SUPPLY APPARATUS

(71) Applicant: DISCO CORPORATION, Tokyo (JP)

(72) Inventors: Satoshi Arai, Tokyo (JP); Jun Saito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 34 days.

(21) Appl. No.: 16/284,505

(22) Filed: Feb. 25, 2019

(65) Prior Publication Data
US 2019/0270170 A1   Sep. 5, 2019

(30) Foreign Application Priority Data
Mar. 1, 2018   (JP) ................ 2018-036406

(51) Int. Cl.
*B23Q 11/12*   (2006.01)
*B23Q 11/14*   (2006.01)

(52) U.S. Cl.
CPC .......... *B23Q 11/126* (2013.01); *B23Q 11/141* (2013.01)

(58) Field of Classification Search
CPC ... B23Q 11/14; B23Q 11/1053; B23Q 11/126; B23Q 11/127; B23Q 11/141; B23Q 11/146
See application file for complete search history.

(56) References Cited

U.S. PATENT DOCUMENTS

| | | | | |
|---|---|---|---|---|
| 4,534,686 A | * | 8/1985 | Nakamura | ........... B23Q 5/10 310/59 |
| 5,664,916 A | * | 9/1997 | Link | ............... B23Q 1/70 310/54 |
| 6,039,517 A | * | 3/2000 | Charewicz | ........ B23Q 3/154 269/8 |
| 6,089,797 A | * | 7/2000 | Chen | ............. B23Q 11/141 165/206 |
| 7,003,971 B2 | * | 2/2006 | Kester | .............. F25B 31/006 165/104.33 |
| 9,895,784 B2 | * | 2/2018 | Shirai | .............. B23Q 11/127 |

FOREIGN PATENT DOCUMENTS

JP   2007127343 A   5/2007

\* cited by examiner

*Primary Examiner* — Nicole N Ramos
(74) *Attorney, Agent, or Firm* — Greer Burns & Crain Ltd.

(57) ABSTRACT

A constant temperature water supply apparatus includes a temperature adjustment unit that circulates cooling water and adjusts the temperature of a spindle unit of a processing apparatus and a processing water temperature adjustment unit. The temperature adjustment unit includes a pump that sends the cooling water to the spindle unit, a cooling water cooling unit, a first pipe that connects the pump and the cooling unit, a second pipe that connects the cooling unit and the spindle unit, and a third pipe that connects the spindle unit and the pump. The processing water temperature adjustment unit includes a processing water pipe that has one end connected to a water source and supplies processing water from the other end side to a processing tool and a heat exchange unit on the processing water pipe.

5 Claims, 4 Drawing Sheets

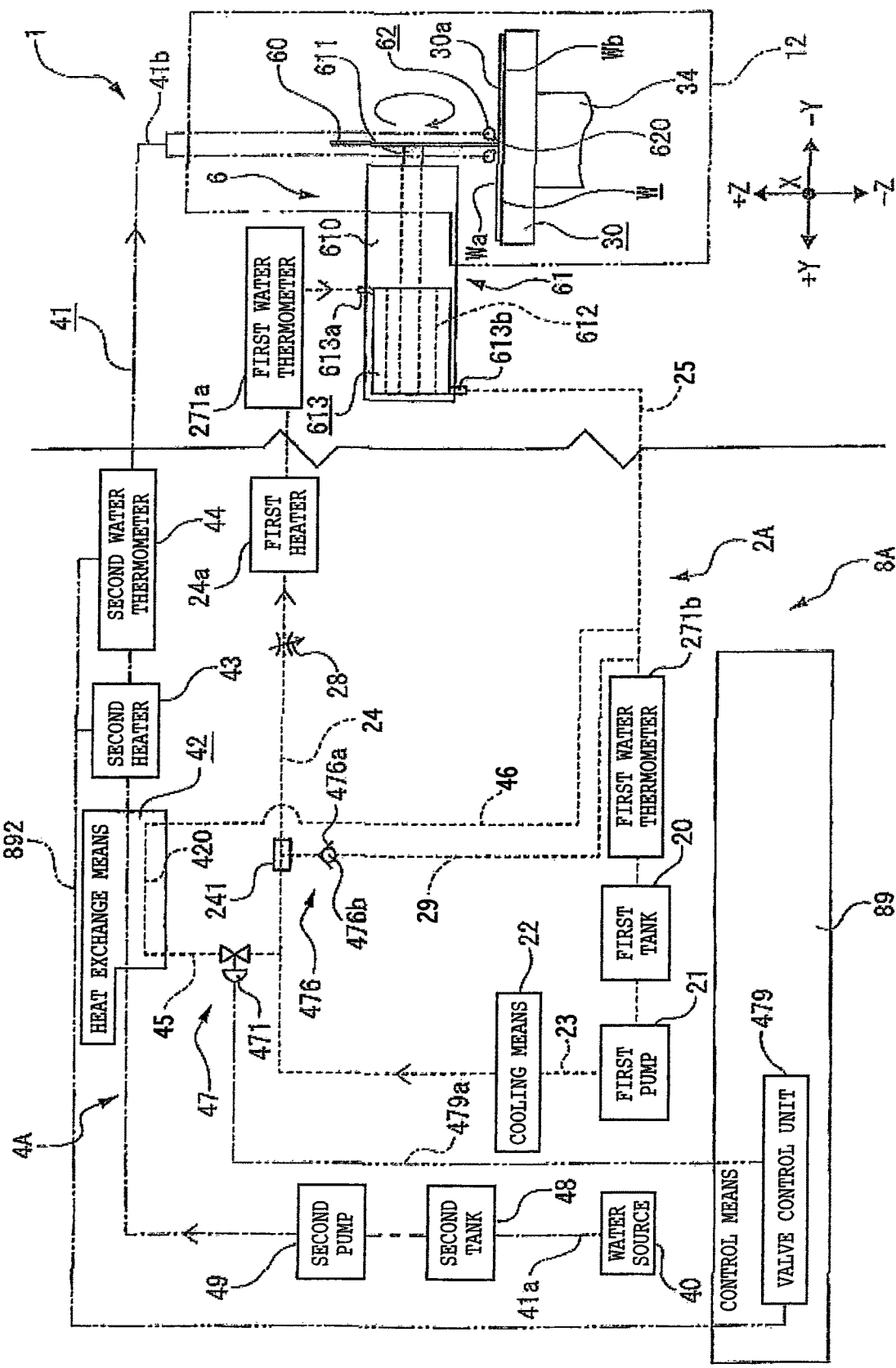

CONSTANT TEMPERATURE WATER SUPPLY APPARATUS

BACKGROUND OF THE INVENTION

Field of the Invention

The present invention relates to a constant temperature water supply apparatus that adjusts water sent out from a water supply source to a constant temperature and supplies the water to a processing apparatus.

Description of the Related Art

A cutting apparatus that cuts a wafer rotates a spindle at high speed and cuts the wafer held by a holding table by a cutting blade that is mounted to a spindle tip and rotates at high speed with the spindle, while supplying cutting water to the cutting blade.

In the cutting apparatus, execution of high-accuracy cutting processing is enabled by preventing a Y-axis direction that is an indexing feed direction and a Z-axis direction that is a cutting-in feed direction from changing due to thermal distortion of the apparatus and so forth. Therefore, the temperature of the cutting apparatus needs to be kept constant. For this purpose, heat generated by a motor that rotationally drives the spindle is removed by circulating cooling water in a cooling water circuit. Therefore, the cutting apparatus needs a constant temperature water supply apparatus that includes the cooling water circuit in which the cooling water used for heat removal of the motor flows and a cutting water circuit in which cutting water used for cleaning and removal of cutting dust and cooling of a processing point flows, and keeps the cooling water and the cutting water at set temperatures (for example refer to Japanese Patent Laid-open No. 2007-127343).

SUMMARY OF THE INVENTION

The cooling water circuit includes first cooling means that cools the cooling water that has been made to flow to a cooling jacket surrounding the motor and whose water temperature has become high due to heat of the motor, a first tank that stores the cooling water, and first heating means (heater) setting the cooling water to a desired temperature when the apparatus is stopped and a temperature of the cooling water has excessively decreased.

In the cutting water circuit, water supplied from factory equipment or the like is stored in a second tank and the water of the second tank is delivered to the cutting apparatus by a pump. During the period before the cutting water sent from the pump reaches the cutting apparatus, the cutting water is cooled by second cooling means or is heated by second heating means to be adjusted to a desired water temperature.

As above, the cooling water circuit and the cutting water circuit include different cooling means and different heating means and thus there is a program that the size of the constant temperature water supply apparatus becomes large.

Thus, an object of the present invention is to provide a constant temperature water supply apparatus in which the numbers of cooling means and heating means are decreased to reduce the size of the apparatus configuration.

In accordance with an aspect of the present invention, there is provided a constant temperature water supply apparatus that supplies constant temperature water to a processing apparatus including a spindle unit configured to have a motor that rotates a spindle to which a processing tool is mounted at high speed and including a holding table that holds a workpiece. The constant temperature water supply apparatus includes unit temperature adjustment means that circulates cooling water and adjusts a temperature of the spindle unit and processing water temperature adjustment means that adjusts a temperature of processing water supplied to the processing tool. The unit temperature adjustment means includes a pump that delivers the cooling water to the spindle unit, cooling means that cools the cooling water, a first pipe that connects the pump and the cooling means, a second pipe that connects the cooling means and a cooling water inlet port of the spindle unit, and a third pipe that connects a cooling water outlet port of the spindle unit and the pump. The processing water temperature adjustment means includes a processing water pipe that has one end connected to a water source and supplies the processing water from an opening on the side of the other end to the processing tool, heat exchange means disposed on the processing water pipe, a fourth pipe that connects the heat exchange means and the second pipe, and a fifth pipe that connects the heat exchange means and the third pipe and returns the cooling water used in the heat exchange means to the third pipe. The processing water is cooled by the cooling water cooled by the cooling means.

Preferably, the unit temperature adjustment means further includes a bypass pipe that connects the second pipe and the third pipe, an adjustment valve that is disposed on the second pipe between a connecting portion that connects the bypass pipe to the second pipe and the cooling water inlet port or on the third pipe and adjusts a flow rate of the cooling water flowing in the spindle unit to a desired flow rate, and a first water thermometer that is disposed between the connecting portion of the second pipe and the cooling water inlet port or on the third pipe and measures the temperature of the cooling water. Furthermore, the processing water temperature adjustment means further includes a second water thermometer that measures the water temperature of the processing water flowing in the processing water pipe between the heat exchange means and the opening of the processing water pipe and adjustment means that varies the flow rate of the cooling water flowing in the fourth pipe and adjusts the temperature of the processing water to a desired temperature in such a manner that a total flow rate of the flow rate of the cooling water flowing in the bypass pipe and the flow rate of the cooling water flowing in the fourth pipe is constant.

Preferably, the adjustment means includes a first valve disposed on the fourth pipe, a second valve disposed on the bypass pipe, and a valve control unit that controls the second valve when the first valve is opened and the first valve when the second valve is opened in such a manner that the total flow rate of the cooling water flowing in the fourth pipe and the bypass pipe is constant, and the adjustment means varies the flow rate of the cooling water flowing in the fourth pipe and adjusts the temperature of the processing water to the desired temperature.

The adjustment means may include a relief valve that opens when a pressure in the bypass pipe becomes equal to or higher than a predetermined pressure instead of the second valve, and the adjustment means may vary the flow rate of the cooling water flowing in the fourth pipe and adjust the temperature of the processing water to the desired temperature.

According to the constant temperature water supply apparatus of the present invention, the processing water can be cooled by the cooling water cooled by the cooling means through the heat exchange means. Therefore, it becomes possible to reduce the size of the apparatus configuration compared with the past constant temperature water supply apparatus in which cooling means that cools the processing water is included also in the processing water temperature adjustment means.

In some cases, the temperature of the processing water supplied from factory equipment to the processing water temperature adjustment means has already become equal to or lower than a set temperature when the processing water is supplied to the contact part between the processing tool and the workpiece and cooling of the processing water by the cooling water through the heat exchange means does not have to be carried out. In this case, the cooling water does not need to be circulated in the fourth pipe, and the temperature of the processing water can be adjusted to a desired temperature through, by the adjustment means, varying the flow rate of the cooling water flowing in the fourth pipe in such a manner that the total flow rate of the flow rate of the cooling water flowing in the bypass pipe and the flow rate of the cooling water flowing in the fourth pipe is constant, that is, causing the cooling water to flow in the bypass pipe and keeping the cooling water from flowing in the fourth pipe or reducing the flow rate of the cooling water flowing in the fourth pipe.

The adjustment means includes the first valve disposed on the fourth pipe, the second valve disposed on the bypass pipe, and the valve control unit that controls the second valve when the first valve is opened and the first valve when the second valve is opened in such a manner that the total flow rate of the cooling water flowing in the fourth pipe and the bypass pipe is constant. Due to this, for example if cooling of the processing water by the cooling water through the heat exchange means does not have to be carried out, the flow rate of the cooling water flowing in the fourth pipe can be varied and the temperature of the processing water can be adjusted to a desired temperature.

The adjustment means includes a relief valve that opens when the pressure in the bypass pipe becomes equal to or higher than a predetermined pressure instead of the second valve, and the adjustment means can vary the flow rate of the cooling water flowing in the fourth pipe and adjust the temperature of the processing water to a desired temperature for example if cooling of the processing water by the cooling water through the heat exchange means does not have to be carried out.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 is a schematic diagram depicting the processing apparatus and further another example of the constant temperature water supply apparatus in which adjustment means includes a relief valve instead of a second valve.

DETAILED DESCRIPTION OF THE PREFERRED EMBODIMENT

Figure 1:
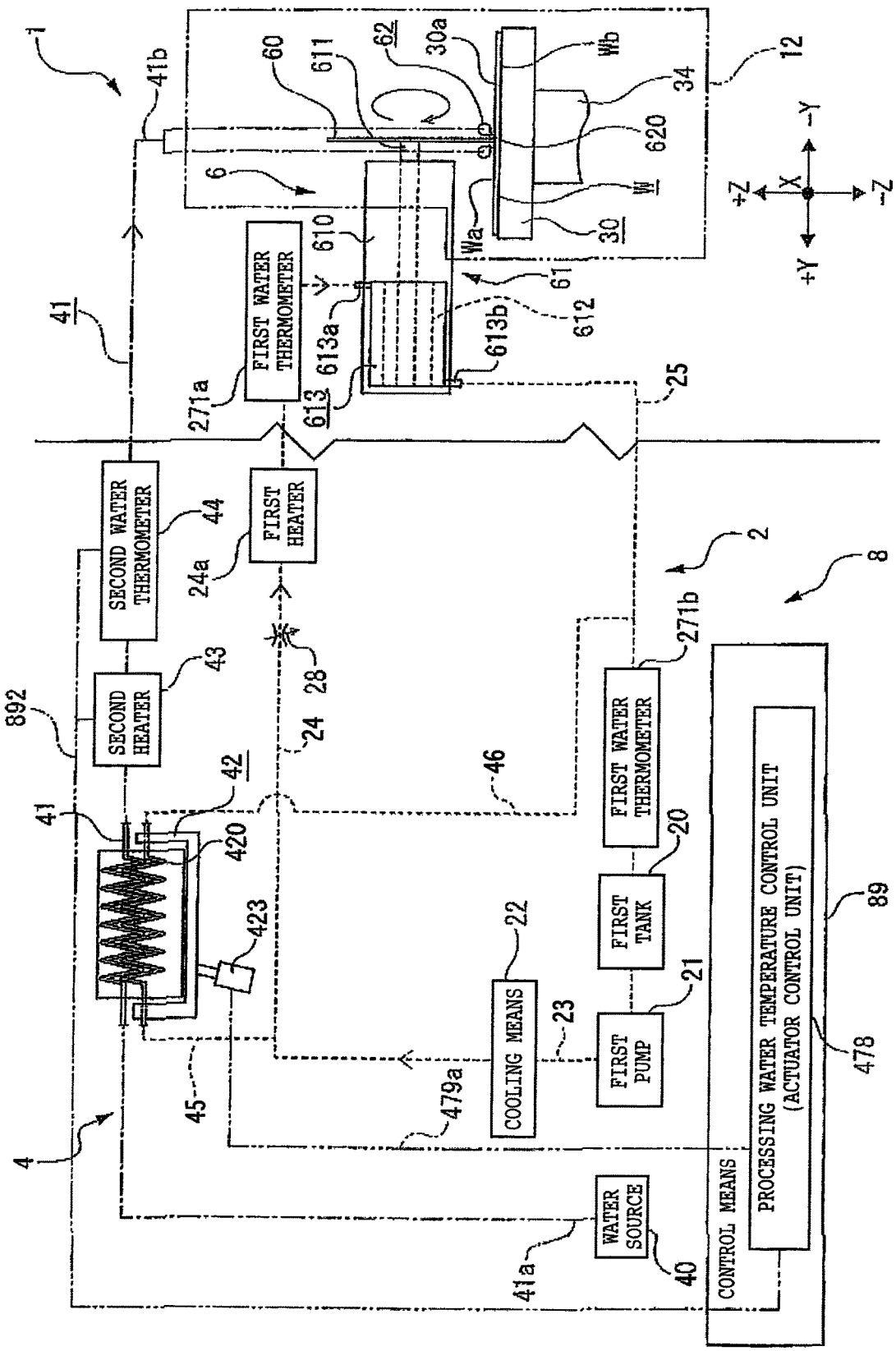
FIG. 1 is a schematic diagram depicting a processing apparatus and one example of a constant temperature water supply apparatus according to the present invention.

In the present embodiment, a processing apparatus 1 that needs a constant temperature water supply apparatus 8 according to the present invention is a cutting apparatus with which cutting processing is carried out for a workpiece W held by suction by a holding table 30 by a processing tool (cutting blade) 60 of processing means 6. However, the processing apparatus 1 is not limited to this example and it suffices for the processing apparatus 1 to have a configuration in which cooling water and processing water supplied from the constant temperature water supply apparatus 8 are used. For example, the processing apparatus 1 may be a grinding apparatus in which a grinding wheel is fixed to a tip part of a spindle with the intermediary of a mount or the like, and so forth.

For example, the processing means 6 includes at least a spindle unit 61 including a spindle 611 that is rotationally driven, a processing tool 60 that is mounted to a tip of the spindle 611 and cuts the workpiece W, and a pair of processing water nozzles 62 that spray processing water to a contact part between the processing tool 60 and the workpiece W (processing point). Furthermore, indexing feed of the processing means 6 in a Y-axis direction is allowed and cutting-in feed thereof in a Z-axis direction is allowed.

As depicted in FIG. 1, the spindle unit 61 includes a spindle housing 610 that horizontally extends in the Y-axis direction and the spindle 611 having the axial center along the Y-axis direction is rotatably housed in the spindle housing 610. The tip part of the spindle 611 protrudes from the spindle housing 610 toward the −Y direction side and the processing tool 60 can be fixed thereto.

For example, a motor 612 that rotationally drives the spindle 611 is joined to the rear end side of the spindle 611 in the spindle housing 610. For example, the motor 612 includes a rotor mounted to the spindle 611 and a stator coil disposed on the outer circumferential side of the rotor. A voltage is applied to the stator coil and thereby the rotor rotates, which rotates the spindle 611, to which the rotor is mounted. Furthermore, to the outer circumferential side of the stator coil of the motor 612, a cooling jacket 613 is attached in such a manner as to surround the whole of the motor 612 for example. In the cooling jacket 613, the cooling water that flows into the cooling jacket 613 from a cooling water inlet port 613*a* cools the motor 612 while passing through a flow path formed inside the cooling jacket 613, and flows out from a cooling water outlet port 613*b*. The configuration of the motor 612 and the cooling jacket 613 is not limited to the present embodiment.

For example, the processing tool 60 is a washer-shaped cutting blade formed into a ring shape through binding of diamond abrasive grains or the like by an appropriate binder of resin, ceramic, or the like and is fixed to the tip part of the spindle 611 by a mount flange or the like (not depicted). The processing tool 60 may be a hub blade including a base that is formed into a circular disc shape and is made of a metal and a cutting edge fixed to the outer circumferential part of the base.

The pair of processing water nozzles 62 extend in parallel to each other along the X-axis direction in such a manner as to sandwich the processing tool 60 below the processing tool

60. At positions opposed to the lower parts of the side surfaces of the processing tool 60 on the pair of processing water nozzles 62, plural spray ports 620 that spray the processing water are disposed to line up along the X-axis direction. The processing water is sprayed from both sides in the Y-axis direction toward the contact part between the processing tool 60 and the workpiece W by the plural spray ports 620, and cooling and cleaning of this contact part is carried out.

The nozzle that supplies the processing water to the processing tool 60 is not limited to the above-described pair of processing water nozzles 62 and a processing water nozzle that supplies the processing water from the blade outer circumferential direction of the processing tool 60 toward the processing tool 60 may be further disposed.

For example, the holding table 30 whose outer shape is a circular shape includes a holding surface 30a that is composed of a porous member or the like and holds the workpiece W by suction. A suction source (not depicted) such as a vacuum generating apparatus communicates with the holding surface 30a and a suction force generated through actuation of the suction source is transmitted to the holding surface 30a on which the workpiece W is placed. This allows the holding table 30 to hold the workpiece W by suction on the holding surface 30a. Furthermore, the holding table 30 is enabled to rotate around the axial center along the Z-axis direction by rotating means 34 disposed below the holding table 30. In addition, cutting feed of the holding table 30 in the X-axis direction is allowed.

The processing apparatus 1 includes a processing chamber 12 for preventing the processing water supplied to the processing tool 60 at the time of cutting processing and generated cutting dust from scattering to the external of the apparatus and is in the state in which the whole of the holding table 30 and part of the processing means 6 are housed in this processing chamber 12. The constant temperature water supply apparatus 8 is located outside the processing chamber 12. The whole of the processing means 6 may be housed in the processing chamber 12.

The constant temperature water supply apparatus 8 according to the present invention includes unit temperature adjustment means 2 that circulates the cooling water and carries out temperature adjustment of the spindle unit 61 and processing water temperature adjustment means 4 that carries out temperature adjustment of the processing water supplied to the processing tool 60.

For example, the unit temperature adjustment means 2 includes a first tank 20 in which the cooling water is stored, a first pump 21 that delivers the cooling water to the spindle unit 61, cooling means 22 such as a chiller unit that cools the cooling water, a first pipe 23 that connects the first pump 21 and the cooling means 22, a second pipe 24 that connects the cooling means 22 and the cooling water inlet port 613a of the cooling jacket 613 of the spindle unit 61, and a third pipe 25 that connects the cooling water outlet port 613b of the cooling jacket 613 of the spindle unit 61 and the first pump 21.

To a water source 40 of factory equipment depicted in FIG. 1, one end 41a of a processing water pipe 41 formed of a metal pipe, a tube having flexibility, or the like is connected. An opening of the processing water pipe 41 on the side of the other end 41b communicates with the pair of processing water nozzles 62. For example, on the processing water pipe 41, heat exchange means 42, a second heater 43, and a second water thermometer 44 are disposed in that order in the direction from the water source 40 toward the pair of processing water nozzles 62 on the downstream side.

The processing water supplied from the water source 40 to the processing water pipe 41 is sprayed from the pair of processing water nozzles 62 after temperature adjustment is carried out, and cooling and cleaning of the contact part between the processing tool 60 and the workpiece W are carried out. Thereafter, for example, the processing water flows down from the holding table 30 and is drained to the external of the processing chamber 12 through water case, drainpipe, and so forth (not depicted).

The second water thermometer 44 measures whether the water temperature of the processing water that flows in the processing water pipe 41 between the heat exchange means 42 and the opening of the processing water pipe 41 on the side of the other end 41b, i.e. the processing water immediately before cooling and cleaning of the contact part between the processing tool 60 and the workpiece W, has become a desired set temperature (for example 22° C.). If the temperature of the processing water that has passed through the heat exchange means 42 is lower than the set temperature, the second heater 43 heats the processing water to raise the temperature of the processing water to the set temperature.

For example, in the heat exchange means 42, the processing water pipe 41 partly formed into a helical shape and a heat transfer pipe 420 with a helical shape are disposed along each other. The heat exchange means 42 includes an actuator 423 that brings the heat transfer pipe 420 closer to or further away from the processing water pipe 41. The heat transfer pipe 420 is connected to a fourth pipe 45 and a fifth pipe 46 to be described later.

For example, in the unit temperature adjustment means 2 in the present embodiment, an adjustment valve (variable throttle valve) 28 that adjusts the flow rate of the cooling water flowing in the spindle unit 61 to a desired flow rate (for example 3 L/minute) is disposed on the second pipe 24. The adjustment valve 28 may be disposed on the third pipe 25.

In the unit temperature adjustment means 2 in the present embodiment, a first heater 24a and a first water thermometer 271a that measures the temperature of the cooling water immediately before cooling of the spindle unit 61 are disposed between the second pipe 24 and the cooling water inlet port 613a of the cooling jacket 613. Furthermore, for example, a first water thermometer 271b that measures the temperature of the cooling water is disposed on the third pipe 25. The first water thermometer 271b measures the temperature of the cooling water immediately before return to the first tank 20 for example. In the present embodiment, the first water thermometers 271a and 271b that measure the temperature of the cooling water are disposed both between the second pipe 24 and the cooling water inlet port 613a and on the third pipe 25. However, a configuration in which only either one is disposed may be employed.

The processing water temperature adjustment means 4 includes the fourth pipe 45 that connects the heat exchange means 42 and the second pipe 24 and the fifth pipe 46 that connects the heat exchange means 42 and the third pipe 25 and returns, to the third pipe 25, the cooling water that has been used in the heat exchange means 42 and has cooled the processing water.

The constant temperature water supply apparatus 8 includes control means 89 that is composed of a central processing unit (CPU), a storing element such as a memory, and so forth and carries out overall control of the respective parts of the constant temperature water supply apparatus 8 for example. A processing water temperature control unit 478 (actuator control unit 478) is incorporated in the control means 89. The processing water temperature control unit 478 can send out a control signal to the actuator 423 through a wireless or wired first communication path 479a.

A description will be made below about the case of cutting the workpiece W by using the processing apparatus 1 depicted in FIG. 1 while using the constant temperature water supply apparatus 8 according to the present invention. The workpiece W held by the holding table 30 is a semiconductor wafer whose outer shape is a circular disc shape for example. On a front surface Wa of the workpiece W oriented upward, plural devices are formed in lattice-manner regions marked out by planned dividing lines. A dicing tape (not depicted) is stuck to a back surface Wb of the workpiece W and the back surface Wb is protected. The workpiece W is not limited to the example depicted in the present embodiment.

The workpiece W held by the holding table 30 is sent in the −X direction (far side of the plane of paper). In addition, the position of the planned dividing line into which the processing tool 60 is made to cut is detected. Thereafter, the processing means 6 moves in the Y-axis direction and position alignment in the Y-axis direction between the planned dividing line and the processing tool 60 is carried out.

The processing means 6 moves down to a predetermined height position at which the processing means 6 fully cuts the workpiece W for example. Furthermore, the motor 612 rotates the spindle 611 at high speed and the processing tool 60 fixed to the spindle 611 rotates at high speed in accordance with the rotation of the spindle 611. Then, the holding table 30 is further sent out in the −X direction at a predetermined cutting feed speed. Thereby, the processing tool 60 cuts into the workpiece W and the workpiece W is cut along the planned dividing line.

In order to remove heat generated due to the rotational driving of the spindle 611 by the motor 612 from the spindle unit 61, the cooling water circulates in the unit temperature adjustment means 2. That is, the cooling water is delivered from the first tank 20 by the first pump 21 at a predetermined flow rate. The cooling water is cooled to a predetermined temperature (for example 19° C.) slightly lower than the set temperature 20° C. of the cooling water (temperature when the cooling water is caused to pass through the cooling jacket 613) by the cooling means 22. Part of the cooling water that is cooled to 19° C. by the cooling means 22 and flows in the second pipe 24 cools the processing water depending on the temperature of the processing water in the water source 40 in some cases. Furthermore, the cooling water that does not cool the processing water and is supplied to the spindle unit 61 in the cooling water is subjected to flow rate adjustment and is heated to the set temperature of 20° C. by the first heater 24a before being supplied to the spindle unit 61.

The purpose of setting the temperature of the cooling water cooled by the cooling means 22 to the temperature (19° C.) lower than the set temperature (20° C.) of the cooling water is to efficiently cool the processing water supplied from the water source 40 at a temperature (for example 26° C.) higher than the set temperature (22° C.) of the processing water by the heat exchange means 42. When there is no need to cool the processing water by the cooling water, or the like (for example when the processing water of the water source 40 is at 18° C.), the cooling water may be cooled to the set temperature (20° C.) by the cooling means 22.

In cutting processing, the processing water (for example, suppose that the temperature thereof is 26° C. in some cases and the temperature is 18° C. in other cases) is sent out from the water source 40 to the processing water pipe 41 at a predetermined flow rate in order to spray the processing water from the spray ports 620 to the processing point that is the contact part between the processing tool 60 and the workpiece W and carry out cooling and cleaning.

Figure 2:
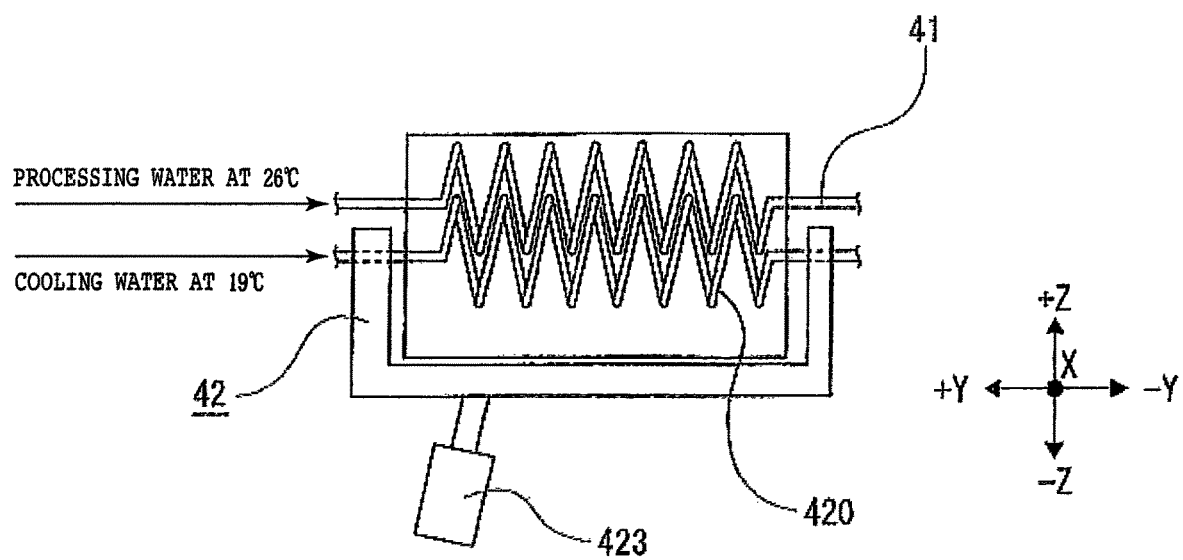
FIG. 2 is a schematic diagram depicting a state of heat exchange means when a temperature of processing water of a water source is 26° C.
Figure 3:
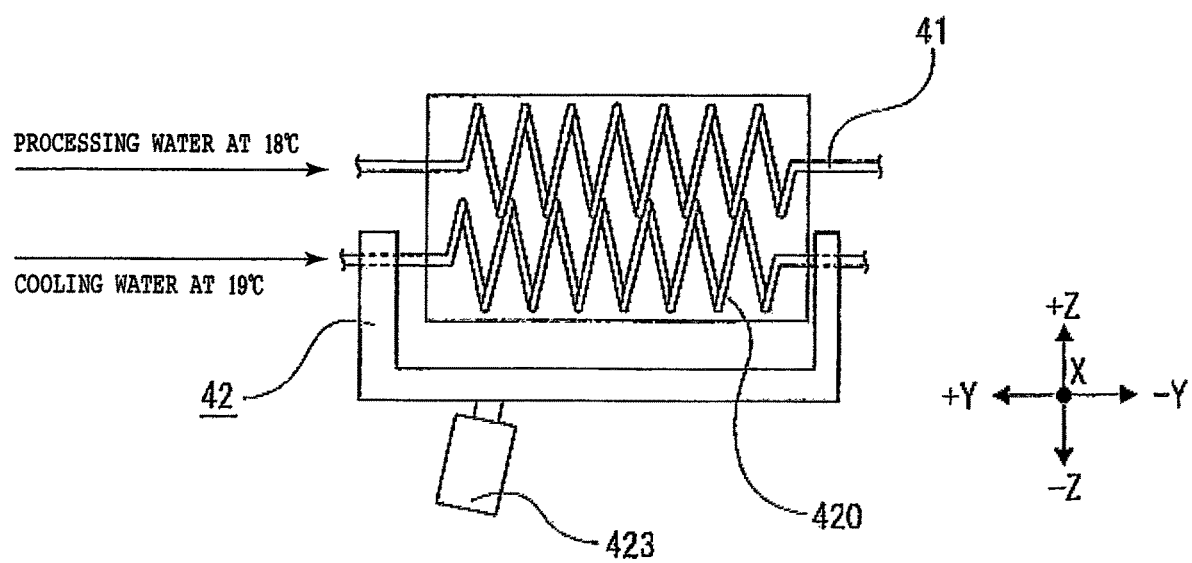
FIG. 3 is a schematic diagram depicting a state of the heat exchange means when the temperature of the processing water of the water source is 18° C.

The cooling water at the temperature of 19° C. that has flown into the fourth pipe 45 passes through the heat transfer pipe 420 of the heat exchange means 42 and flows to the fifth pipe 46. For example, in the present embodiment, the actuator 423 is controlled by the processing water temperature control unit 478 in such a manner that the water temperature of the processing water measured by the second water thermometer 44 after the passing through the heat exchange means 42 becomes the set temperature (for example 22° C.), and the contact area between the heat transfer pipe 420 and the processing water pipe 41 is varied to control the heat exchange rate. Specifically, for example, as depicted in FIG. 2, when the temperature of the processing water supplied from the water source 40 is 26° C. higher than the set temperature of 22° C., the actuator 423 is operated by the processing water temperature control unit 478 in such a manner that the contact area between the heat transfer pipe 420 and the processing water pipe 41 is increased to allow sufficient heat exchange. Furthermore, as depicted in FIG. 3, when the temperature of the processing water supplied from the water source 40 is 18° C. lower than the set temperature of 22° C., the actuator 423 is operated by the processing water temperature control unit 478 to separate the heat transfer pipe 420 and the processing water pipe 41, so that heat exchange is not carried out.

If the processing water that has passed through the heat exchange means 42 is excessively cooled and the temperature thereof becomes equal to or lower than the set temperature, the processing water is heated to the above-described set temperature by the second heater 43 depicted in FIG. 1. For example, the second water thermometer 44 is electrically connected to the control means 89 by a wireless or wired second communication path 892 and the temperature of the processing water that has passed through the heat exchange means 42 is measured by the second water thermometer 44. If a deviation from the set temperature of 22° C. exists, measured temperature information is fed back from the second water thermometer 44 to the control means 89. Furthermore, adjustment to correct this deviation of the temperature by the processing water temperature control unit 478 may be reflected in actuator operation.

While the temperature of the processing water after cooling immediately before being supplied to the pair of processing water nozzles 62 is measured by the second water thermometer 44 depicted in FIG. 1, the processing water is sprayed from the spray ports 620 of the pair of processing water nozzles 62 to the processing point (contact part) between the processing tool 60 and the workpiece W to carry out cooling and cleaning of the processing point.

The cooling water that has passed through the heat transfer pipe 420 passes through the fifth pipe 46 and the third pipe 25 and is returned to the first tank 20 with the cooling water that has cooled the spindle unit 61 to be described later.

Meanwhile, the cooling water at the temperature of 19° C. flowing in the second pipe 24 toward the spindle unit 61 reaches the adjustment valve 28. The adjustment valve 28 works as a bottleneck that sets the flow rate of the cooling water flowing in the spindle unit 61 and the flow rate of the cooling water flowing in the spindle unit 61 is adjusted to a desired flow rate (for example flow rate of 3 L/minute). Furthermore, while the cooling water goes through heating by the first heater 24a and the temperature before cooling of the spindle unit 61 is finally measured by the first water thermometer 271a, the cooling water at the set temperature of 20° C. passes through the cooling jacket 613 at the flow rate of 3 L/minute and the spindle unit 61 is cooled by the cooling jacket 613. The cooling water after the passing through the cooling jacket 613 has been warmed through absorption of heat of the motor 612 and is returned to the first tank 20 through the third pipe 25.

For example, the cooling water that has passed through the heat exchange means 42 and the cooling water that has cooled the spindle unit 61 are mixed and then the temperature thereof is measured by the first water thermometer 271b. Then, the cooling water is returned to the first tank 20 and thereafter is sent out to the side of the cooling means 22 by the first pump 21 and is cooled to for example 19° C. by the cooling means 22. Thereby, the cooling water is reused again as the cooling water for cooling of the processing water and the cooling water for cooling of the spindle unit 61. Information about the temperature measured by the first water thermometer 271b is used for output power adjustment and so forth of the cooling means 22 when the cooling water begins to circulate in the unit temperature adjustment means 2 and the cooling water that has cooled the processing water and has been warmed and the cooling water that has cooled the spindle unit 61 and has been warmed are cooled to 19° C. again by the cooling means 22 for example.

As described above, the constant temperature water supply apparatus 8 according to the present invention has a configuration in which only the unit temperature adjustment means 2 includes the cooling means 22. Furthermore, the processing water can be cooled by the cooling water cooled by this cooling means 22 through the heat exchange means 42. This can reduce the size of the apparatus configuration compared with the past constant temperature water supply apparatus in which cooling means that cools the processing water is included also in the processing water temperature adjustment means.

Figure 4:
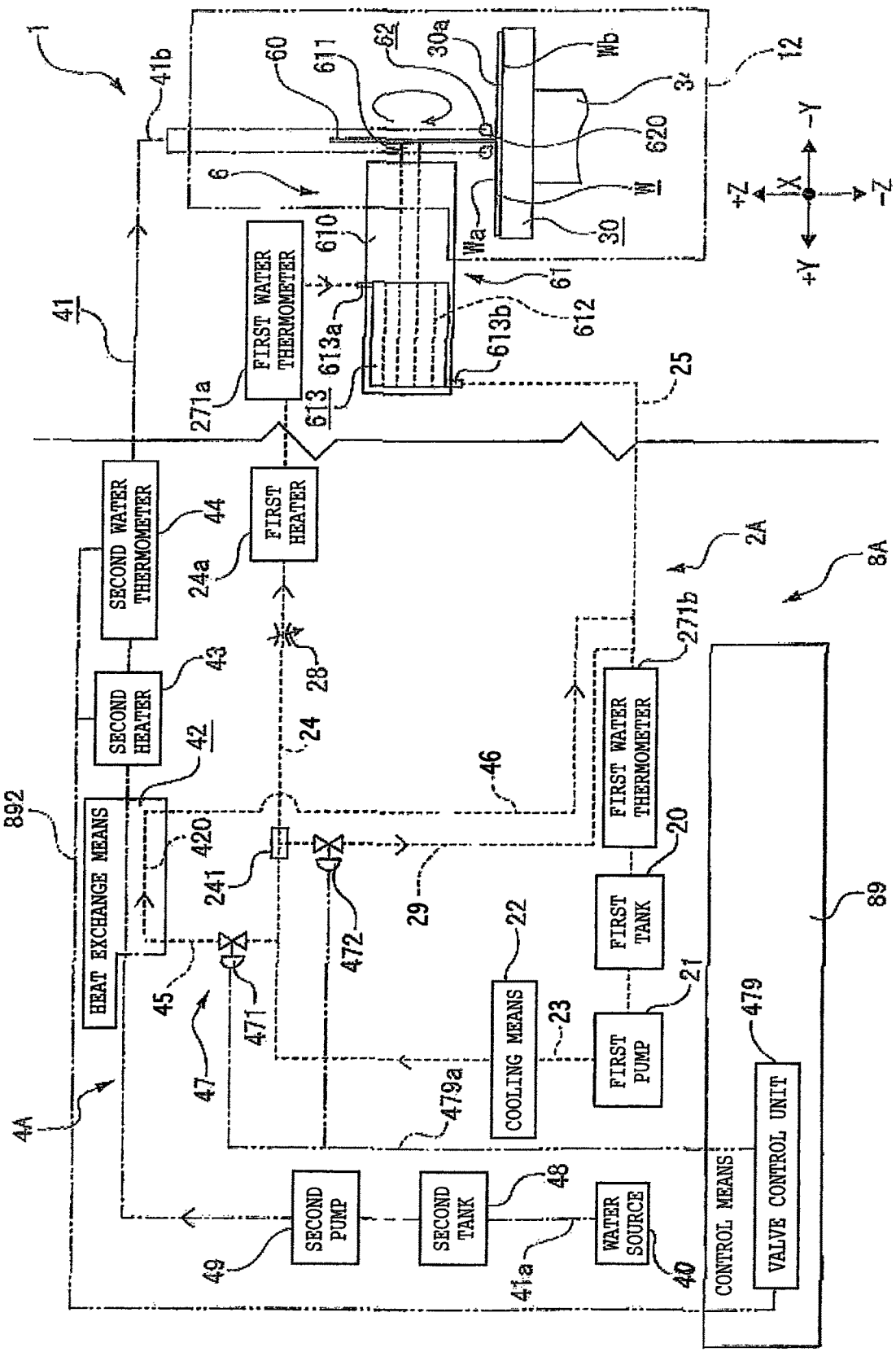
FIG. 4 is a schematic diagram depicting the processing apparatus and another example of the constant temperature water supply apparatus according to the present invention.

A constant temperature water supply apparatus 8A depicted in FIG. 4 is an apparatus obtained by changing part of the configuration of the constant temperature water supply apparatus 8 depicted in FIG. 1. In the constant temperature water supply apparatus 8A, for example, the heat exchange means 42 has a shell (tube) and the processing water pipe 41 and plural or single heat transfer pipe 420 are housed along each other in this shell. The heat transfer pipe 420 is connected to the fourth pipe 45 and the fifth pipe 46 to be described later.

Furthermore, for example, in unit temperature adjustment means 2A in the present embodiment, a connecting portion 241 such as a T-pipe is disposed on the second pipe 24 and the second pipe 24 and the third pipe 25 are connected by a bypass pipe 29 connected to this connecting portion 241. Moreover, the adjustment valve 28 described above is disposed between the connecting portion 241 of the second pipe 24 and the cooling water inlet port 613a of the cooling jacket 613. The adjustment valve 28 may be disposed on the third pipe 25.

Processing water temperature adjustment means 4A in the present embodiment includes adjustment means 47 that varies the flow rate of cooling water flowing in the fourth pipe 45 and adjusts the temperature of processing water to a desired temperature in such a manner that the total flow rate of the flow rate of the cooling water flowing in the bypass pipe 29 and the flow rate of the cooling water flowing in the fourth pipe 45 is constant. Furthermore, for example, the processing water temperature adjustment means 4A includes a second tank 48 and a second pump 49 on the downstream side relative to the water source 40 on the processing water pipe 41. The processing water supplied from the water source 40 is stored in the second tank 48 and the processing water in the second tank 48 is delivered from the second tank 48 toward the pair of processing water nozzles 62 by the second pump 49. If the processing water is ensured in such a manner that the water amount of the processing water supplied from the water source 40 is always larger than the water amount of the processing water used by the processing apparatus 1 (that is, in the case in which the water pressure from the water source 40 is always applied to the side of the processing water pipe 41 and, when a valve is opened, the processing water automatically flows into the processing water pipe 41 without sending out the processing water to the processing water pipe 41 by a pressure generated by a pump), the processing water temperature adjustment means 4A does not have to include the second tank 48 and the second pump 49.

The adjustment means 47 includes a first valve 471 disposed on the fourth pipe 45, a second valve 472 disposed on the bypass pipe 29, and a valve control unit 479 that controls the first valve 471 and the second valve 472. The first valve 471 and the second valve 472 are proportional electromagnetic valves for example. However, they are not limited thereto.

The above-described valve control unit 479 is incorporated in the control means 89. The valve control unit 479 can send out a control signal to the first valve 471 and the second valve 472 through the wireless or wired first communication path 479a. The valve control unit 479 controls opening/closing of the second valve 472 when the first valve 471 is opened and opening/closing of the first valve 471 when the second valve 472 is opened in such a manner that the total flow rate of the cooling water flowing in the fourth pipe 45 and the bypass pipe 29 is constant. That is, the valve control unit 479 continuously controls the flow rate of the cooling water flowing in the fourth pipe 45 and the flow rate of the cooling water flowing in the bypass pipe 29 in a range of 0% to 100% for each by changing the control signal to the first valve 471 and the second valve 472. The control of the first valve 471 and the second valve 472 by the valve control unit 479 may be ON/OFF control in which the first valve 471 and the second valve 472 are fully closed to stop the fluid or are fully opened to cause the fluid to flow.

The adjustment means 47 may include a relief valve 476 depicted in FIG. 5 that automatically opens when the pressure in the bypass pipe 29 becomes a predetermined pressure or higher due to the cooling water that flows into the bypass pipe 29, instead of the second valve 472 that opens and closes under control by the valve control unit 479.

A description will be made below about operation of the constant temperature water supply apparatus 8A depicted in FIG. 4 when the processing apparatus 1 is cutting the workpiece W. In order to remove heat generated due to the rotational driving of the spindle 611 by the motor 612 from the spindle unit 61, the cooling water circulates in the unit temperature adjustment means 2A. That is, the cooling water is delivered from the first tank 20 by the first pump 21 at a predetermined flow rate of V L/minute. The cooling water is cooled to a predetermined temperature (for example 19° C.) slightly lower than the set temperature 20° C. of the cooling water by the cooling means 22. Furthermore, part of the cooling water that is cooled to 19° C. by the cooling means 22 and flows in the second pipe 24 cools the processing water to be described later. Moreover, the cooling water that does not cool the processing water and is supplied to the spindle unit 61 in the cooling water is heated to the set temperature of 20° C. by the first heater 24a before being supplied to the spindle unit 61.

In cutting processing, the processing water at a temperature of 26° C. for example is sent out from the second tank 48 to the processing water pipe 41 by the second pump 49 at a predetermined flow rate in order to spray the processing water from the spray ports 620 to the processing point that is the contact part between the processing tool 60 and the workpiece W and carry out cooling and cleaning.

On the downstream side of the second pump 49 on the processing water pipe 41, the processing water at the temperature of 26° C. is cooled by the cooling water in the heat exchange means 42 in such a manner that the temperature thereof becomes the set temperature (for example 22° C.). Specifically, the control signal is sent out from the valve control unit 479 of the adjustment means 47 to the first valve 471 and the second valve 472 and the degree of opening of the first valve 471 and the second valve 472 is adjusted. The first valve 471 is opened and the flow rate of the cooling water flowing in the fourth pipe 45 becomes V1 L/minute and the flow rate of the cooling water flowing in the bypass pipe 29 becomes V2 L/minute (in the present embodiment, suppose that the second valve 472 is completely closed and V2 L/minute is 0 L/minute).

The flow rate V1 L/minute of the cooling water flowing in the fourth pipe 45 is set in consideration of the flow rate of the processing water flowing in the heat exchange means 42, the temperature thereof (in the present embodiment, 26° C.), the set temperature of the processing water (for example 22° C.), the flow rate of the cooling water desired to flow in the spindle unit 61 (flow rate on the downstream side relative to the connecting portion 241 of the second pipe 24, and flow rate equal to or higher than at least 3 L/minute), and so forth. For example, if the flow rate of the processing water flowing in the heat exchange means 42 is lower and the temperature thereof is for example 24° C., which is higher than the set temperature of 22° C. but is lower than the temperature in the present embodiment (26° C.), the flow rate V2 L/minute of the cooling water flowing in the bypass pipe 29 is set higher and the flow rate V1 L/minute of the cooling water flowing in the fourth pipe 45 is decreased relatively.

The total flow rate of the flow rate V2 L/minute of the cooling water flowing in the bypass pipe 29 and the flow rate V1 L/minute of the cooling water flowing in the fourth pipe 45 (remaining flow rate obtained by subtracting the flow rate of the cooling water desired to flow in the spindle unit 61 from the delivery flow rate V L/minute of the first pump 21) is constant.

The cooling water at the temperature of 19° C. flowing in the fourth pipe 45 at the flow rate of V1 L/minute passes through the heat transfer pipe 420 of the heat exchange means 42 and flows into the fifth pipe 46. Concurrently the processing water at the temperature of 26° C. passes through the heat exchange means 42. Thereby, heat exchange is carried out between the processing water and the cooling water, and the processing water is cooled to a predetermined temperature (for example 22° C., which is the set temperature, or 21° C., which is equal to or lower than the set temperature) and conversely the cooling water is warmed.

If the processing water that has passed through the heat exchange means 42 is excessively cooled and the temperature thereof becomes lower than the set temperature, the processing water is heated to the above-described set temperature by the second heater 43.

While the temperature of the processing water after cooling immediately before being supplied to the pair of processing water nozzles 62 is measured by the second water thermometer 44, the processing water is sprayed from the spray ports 620 of the pair of processing water nozzles 62 to the processing point (contact part) between the processing tool 60 and the workpiece W to carry out cooling and cleaning of the processing point.

The temperature of the processing water that has passed through the heat exchange means 42 is measured by the second water thermometer 44. If deviation from the set temperature of 22° C. exists, information on the measured temperature is fed back from the second water thermometer 44 to the control means 89. Furthermore, adjustment to correct this deviation of the temperature by the valve control unit 479 may be carried out through adjustment of the degree of opening of the first valve 471 and the second valve 472.

The cooling water that has cooled the processing water passes through the fifth pipe 46 and the third pipe 25 and is returned to the first tank 20 with the cooling water that has cooled the spindle unit 61 to be described later.

Meanwhile, the cooling water at the temperature of 19° C. flowing in the second pipe 24 toward the spindle unit 61 is adjusted to a desired flow rate (for example flow rate of 3 L/minute). Furthermore, while the cooling water goes through heating by the first heater 24a and the temperature before cooling of the spindle unit 61 is finally measured by the first water thermometer 271a, the cooling water at the set temperature of 20° C. passes through the cooling jacket 613 at the flow rate of 3 L/minute and the spindle unit 61 is cooled by the cooling jacket 613. The cooling water after the passing through the cooling jacket 613 has been warmed through absorption of heat of the motor 612 and is returned to the first tank 20 through the third pipe 25.

For example, the cooling water that has cooled the processing water and the cooling water that has cooled the spindle unit 61 are mixed and then the temperature thereof is measured by the first water thermometer 271b. Then, the cooling water is returned to the first tank 20 and thereafter is sent out to the side of the cooling means 22 by the first pump 21 and is cooled to for example 19° C. by the cooling means 22. Thereby, the cooling water is reused again as the cooling water for cooling of the processing water and the cooling water for cooling of the spindle unit 61.

As described above, the constant temperature water supply apparatus 8A according to the present invention has a configuration in which only the unit temperature adjustment means 2A includes the cooling means 22. Furthermore, the processing water can be cooled by the cooling water cooled by this cooling means 22, through the heat exchange means 42. This can reduce the size of the apparatus configuration compared with the past constant temperature water supply apparatus in which cooling means that cools the processing water is included also in the processing water temperature adjustment means.

For example, as depicted in FIG. 5, if the temperature of the processing water supplied from the water source 40 of factory equipment is equal to or lower than the set temperature (for example 22° C.) when the processing water is sprayed to the processing point between the processing tool 60 and the workpiece W (for example if the temperature of the processing water is 18° C.), the processing water does not need to be cooled by the cooling water. The operation of the constant temperature water supply apparatus 8A in this case is as follows.

In the present embodiment, for example, the relief valve 476 depicted in FIG. 5 may be disposed on the bypass pipe 29 instead of the second valve 472 of the adjustment means 47 depicted in FIG. 4. Not the relief valve 476 but the second valve 472 may be disposed.

In order to remove heat from the spindle unit 61, the cooling water is sent out from the first tank 20 by the first pump 21 at a predetermined flow rate of V L/minute. The cooling water is cooled to a predetermined temperature (for example 19° C.) by the cooling means 22. In order to carry out cooling and cleaning of the processing point in cutting processing, the processing water at the temperature of 18° C. is sent out from the second tank 48 to the processing water pipe 41 by the second pump 49 at a predetermined flow rate.

A control signal is sent out from the valve control unit 479 of the adjustment means 47 to the first valve 471 and the first valve 471 is completely closed, so that the flow rate of the cooling water flowing in the fourth pipe 45 becomes 0 L/minute. Therefore, part of the cooling water at the temperature of 19° C. passes through the adjustment valve 28 of the second pipe 24 and flows toward the spindle unit 61 to cool the spindle unit 61 similarly to the case depicted in FIG. 1. Thereafter, the cooling water is returned to the first tank 20 to be reused.

Furthermore, the cooling water that is to flow in the fourth pipe 45 originally flows into the bypass pipe 29. The pressure inside the pipe becomes equal to or higher than a predetermined pressure due to this cooling water flowing in the bypass pipe 29 toward the side of the first tank 20. This makes the state in which a ball disc 476b of the relief valve 476 is separated from a seat surface 476a and the valve is opened, so that the cooling water passes in the bypass pipe 29. Then, the cooling water is returned to the first tank 20 with the cooling water that has cooled the spindle unit 61 and is reused as the cooling water for cooling of the spindle unit 61.

The processing water at the water temperature of 18° C. that has passed through the heat exchange means 42 is heated by the second heater 43 until the temperature thereof becomes 22° C., which is the set temperature of the processing water, under control by the control means 89. The processing water after passing through the second heater 43 is subjected to temperature measurement by the second water thermometer 44. If deviation from the set temperature of 22° C. exists, information on the measured temperature is fed back from the second water thermometer 44 to the control means 89 and output power adjustment to correct this deviation of the temperature is carried out on the second heater 43 by the control means 89. Then, the processing water at the set temperature of 22° C. is sprayed from the spray ports 620 of the pair of processing water nozzles 62 to the processing point between the processing tool 60 and the workpiece W to carry out cooling and cleaning of the processing point.

As described above, the unit temperature adjustment means 2A includes the bypass pipe 29 that connects the second pipe 24 and the third pipe 25, the adjustment valve 28 that is disposed on the second pipe 24 between the connecting portion 241 that connects the bypass pipe 29 to the second pipe 24 and the cooling water inlet port 613a and adjusts the flow rate of the cooling water flowing in the spindle unit 61 to a desired flow rate, and the first water thermometers 271a and 271b that are disposed between the connecting portion 241 of the second pipe 24 and the cooling water inlet port 613a and on the third pipe 25 and measure the temperature of the cooling water. The processing water temperature adjustment means 4A includes the second water thermometer 44 that measures the water temperature of the processing water flowing in the processing water pipe 41 between the heat exchange means 42 and the opening of the processing water pipe 41 and the adjustment means 47 that varies the flow rate of the cooling water flowing in the fourth pipe 45 and adjusts the temperature of the processing water to a desired temperature in such a manner that the total flow rate of the flow rate of the cooling water flowing in the bypass pipe 29 and the flow rate of the cooling water flowing in the fourth pipe 45 is constant. Furthermore, if the temperature of the processing water supplied from the water source 40 of factory equipment surpasses the set temperature and cooling of the processing water by the cooling water through the heat exchange means 42 needs to be carried out as in the case explained by using FIG. 4, the cooling water can be caused to flow in the fourth pipe 45 by the adjustment means 47 and the temperature of the processing water can be adjusted to the desired temperature by the cooling water passing through the heat exchange means 42.

On the other hand, as depicted in FIG. 5, if the temperature of the processing water supplied from the water source 40 of factory equipment has already become equal to or lower than the set temperature and cooling of the processing water by the cooling water through the heat exchange means 42 does not have to be carried out, the temperature of the processing water can be adjusted to a desired temperature by keeping the cooling water from passing through the fourth pipe 45 and causing the cooling water to flow in the bypass pipe 29 by the adjustment means 47.

As depicted in FIG. 4, the adjustment means 47 includes the first valve 471 disposed on the fourth pipe 45, the second valve 472 disposed on the bypass pipe 29, and the valve control unit 479 that controls the second valve 472 when the first valve 471 is opened and the first valve 471 when the second valve 472 is opened in such a manner that the total flow rate of the cooling water flowing in the fourth pipe 45 and the bypass pipe 29 is constant. Due to this, for example if cooling of the processing water by the cooling water through the heat exchange means 42 needs to be carried out, the cooling water can be caused to flow in the fourth pipe 45 and the temperature of the processing water can be adjusted to a desired temperature.

As depicted in FIG. 5, by including the relief valve 476 that opens when the pressure in the bypass pipe 29 becomes equal to or higher than a predetermined pressure instead of the second valve 472 depicted in FIG. 4, the adjustment means 47 can keep the cooling water from flowing in the fourth pipe 45 and adjust the temperature of the processing water to a desired temperature for example if cooling of the processing water by the cooling water through the heat exchange means 42 does not have to be carried out as in the case depicted in FIG. 5 for example.

The constant temperature water supply apparatuses 8 and 8A according to the present invention are not limited to the above-described embodiment. Furthermore, the respective configurations of the constant temperature water supply apparatuses 8 and 8A and the processing apparatus 1 depicted in the accompanying drawings are also not limited thereto and can be changed as appropriate within the range in which effects of the present invention can be exerted.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. Constant temperature water supply apparatus that supplies constant temperature water to a processing apparatus including a spindle unit configured to have a motor that rotates a spindle to which a processing tool is mounted at high speed and including a holding table that holds a workpiece, the constant temperature water supply apparatus comprising:

unit temperature adjustment means that circulates cooling water and adjusts a temperature of the spindle unit; and processing water temperature adjustment means that adjusts a temperature of processing water supplied to the processing tool, wherein the unit temperature adjustment means includes a pump that delivers the cooling water to the spindle unit, a chiller that cools the cooling water, a first pipe that connects the pump and the chiller, a second pipe that connects the chiller and a cooling water inlet port of the spindle unit, and a third pipe that connects a cooling water outlet port of the spindle unit and the pump, the processing water temperature adjustment means includes a processing water pipe that has one end connected to a water source and supplies the processing water from an opening on a side of other end to the processing tool, a heat exchanger disposed on the processing water pipe, a fourth pipe that connects the heat exchanger and the second pipe, and a fifth pipe that connects the heat exchanger and the third pipe and returns the cooling water used in the heat exchanger to the third pipe, and the processing water is cooled by the cooling water cooled by the chiller.

2. The constant temperature water supply apparatus according to claim 1, wherein the unit temperature adjustment means further includes a bypass pipe that connects the second pipe and the third pipe, an adjustment valve that is disposed on the second pipe between a connecting portion that connects the bypass pipe to the second pipe and the cooling water inlet port or on the third pipe and adjusts a flow rate of the cooling water flowing in the spindle unit to a desired flow rate, and a first water thermometer that is disposed between the connecting portion of the second pipe and the cooling water inlet port or on the third pipe and measures a temperature of the cooling water, and the processing water temperature adjustment means further includes a second water thermometer that measures a water temperature of the processing water flowing in the processing water pipe between the heat exchanger and the opening of the processing water pipe and a flow rate adjustment means that varies a flow rate of the cooling water flowing in the fourth pipe and adjusts the temperature of the processing water to a desired temperature in such a manner that a total flow rate of a flow rate of the cooling water flowing in the bypass pipe and the flow rate of the cooling water flowing in the fourth pipe is constant.

3. The constant temperature water supply apparatus according to claim 2, wherein the flow rate adjustment means includes a first valve disposed on the fourth pipe, a second valve disposed on the bypass pipe, and a valve control unit configured to control the second valve when the first valve is opened and the first valve when the second valve is opened in such a manner that the total flow rate of the cooling water flowing in the fourth pipe and the bypass pipe is constant, and the adjustment means varies the flow rate of the cooling water flowing in the fourth pipe and adjusts the temperature of the processing water to the desired temperature.

4. The constant temperature water supply apparatus according to claim 2, wherein the flow rate adjustment means includes a first valve disposed on the fourth pipe and a relief valve that is disposed on the bypass pipe and opens when a pressure in the bypass pipe becomes equal to or higher than a predetermined pressure, the adjustment means varies the flow rate of the cooling water flowing in the fourth pipe and adjusts the temperature of the processing water to the desired temperature.

5. The constant temperature water supply apparatus according to claim 2, wherein the heat exchanger comprises the processing water pipe disposed along a heat transfer pipe, and an actuator to bring the heat transfer pipe closer to or farther away from the processing water pipe.

* * * * *